(12) United States Patent
McGuire et al.

(10) Patent No.: US 7,506,660 B2
(45) Date of Patent: Mar. 24, 2009

(54) GATE VALVE WITH REPLACEABLE INSERTS AND METHOD OF REFURBISHING SAME

(75) Inventors: Bob McGuire, Moore, OK (US); L. Murray Dallas, Streetman, TX (US)

(73) Assignee: Stinger Wellhead Protection, Inc., Oklahoma City, OK (US)

( * ) Notice: Subject to any disclaimer, the term of this patent is extended or adjusted under 35 U.S.C. 154(b) by 0 days.

(21) Appl. No.: 11/998,231

(22) Filed: Nov. 29, 2007

(65) Prior Publication Data

US 2008/0093576 A1 Apr. 24, 2008

Related U.S. Application Data

(62) Division of application No. 10/979,427, filed on Nov. 2, 2004.

(51) Int. Cl.
*F16K 3/30* (2006.01)
(52) U.S. Cl. .................. 137/242; 137/375; 251/327; 251/329; 251/361; 251/363
(58) Field of Classification Search ......... 251/326–329, 251/360–363; 137/242, 375
See application file for complete search history.

(56) References Cited

U.S. PATENT DOCUMENTS

| | | |
|---|---|---|
| 1,995,727 A | 3/1935 | Wetherbee |
| 3,194,259 A | 7/1965 | Garrod |
| 3,217,739 A | 11/1965 | La Valley et al. |
| 3,497,177 A | 2/1970 | Hulsey |
| 3,624,882 A | 12/1971 | Gustafson |
| 3,701,359 A | 10/1972 | Worley et al. |
| 3,780,982 A * | 12/1973 | Kemp .................. 251/210 |
| 4,051,863 A | 10/1977 | Still |
| 4,163,544 A | 8/1979 | Fowler et al. |
| 4,184,507 A | 1/1980 | Richards |
| 4,311,166 A | 1/1982 | De Feo |
| 4,429,710 A | 2/1984 | Grieves et al. |
| 4,446,887 A | 5/1984 | Redmon et al. |
| 4,458,879 A | 7/1984 | Jandrasi |
| 4,651,970 A * | 3/1987 | Sadler .................. 251/297 |

(Continued)

OTHER PUBLICATIONS

Worldwide Web pages associated with Manluk Industries, Inc., various pages dated Jul. 7, 2002; Nov. 25, 2002; and Dec. 12, 2004.

(Continued)

*Primary Examiner*—John Bastianelli
(74) *Attorney, Agent, or Firm*—Nelson Mullins Riley & Scarborough, LLP

(57) ABSTRACT

A gate valve includes a valve body having a cylindrical passage defining a flow path through the valve, a gate for controlling fluid flow through the valve and a replaceable wear-resistant flow-path liner for in the flow path. The flow-path liner includes a plurality of replaceable wear-resistant inserts, including wear sleeves lining ports of the valve body, valve seats and a gate insert for a flow path bore through the gate. Each replaceable valve seat has a wiper ring for cleaning the gate when it opens and closes. By regularly inspecting and replacing worn-out inserts, the service life of the gate valve can be prolonged and the expense associated with replacing or rebuilding the valve body is avoided.

20 Claims, 6 Drawing Sheets

U.S. PATENT DOCUMENTS

| | | | |
|---|---|---|---|
| 4,765,361 A | | 8/1988 | Clifford |
| 4,971,101 A | * | 11/1990 | Becker et al. ............... 137/375 |
| 5,377,955 A | | 1/1995 | Baker |
| 5,626,164 A | | 5/1997 | Richard et al. |
| 7,204,474 B2 | | 4/2007 | McGuire et al. |
| 7,213,641 B2 | | 5/2007 | McGuire et al. |
| 2006/0090891 A1 | * | 5/2006 | McGuire et al. ........... 166/90.1 |

OTHER PUBLICATIONS

Worldwide Web pages associated with Integrated Production Services, various pages dated Sep. 25, 2003 and Feb. 1, 2008.

* cited by examiner

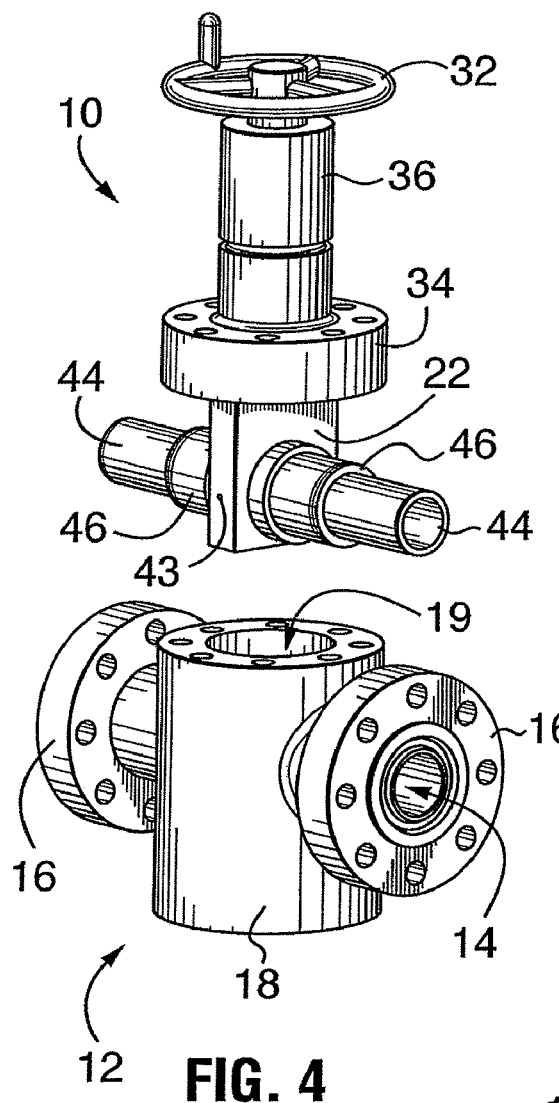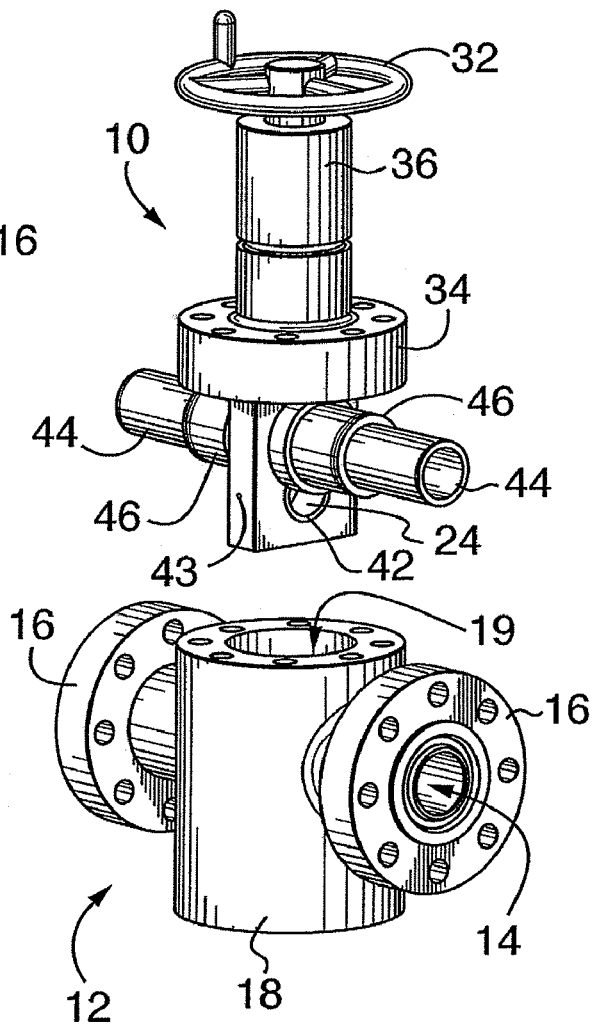

GATE VALVE WITH REPLACEABLE INSERTS AND METHOD OF REFURBISHING SAME

CROSS-REFERENCE TO RELATED APPLICATIONS

This is a division of U.S. patent application Ser. No. 10/979,427 filed Nov. 2, 2004, the entire disclosure which is incorporated by reference herein.

MICROFICHE APPENDIX

Not Applicable.

TECHNICAL FIELD

The present invention relates in general to high-pressure valves for the oil and gas industry and, in particular, to gate valves used in severe service applications in which flow path components of the valve are subject to wear.

BACKGROUND OF THE INVENTION

Gate valves are used in the oil and gas industry for heating and treating systems, cementing, fracturing and acidizing and other well stimulation applications in which high working pressures and abrasive and/or corrosive fluids are conducted at high flow rates.

Because a gate valve is subjected to high pressures, corrosive fluids and abrasive proppants (such as sand, resin-coated sand or sintered bauxite) the components of the gate valve that form the flow path through the valve tend to erode. As is well known in the art, component wear causes close-fitting components to loose their initial shape, thereby rendering the gate valve more prone to leaking. In order to mitigate the effects of wear, gate valves used in severe service conditions require regular maintenance and refurbishment. The non-replaceable components of gate valves are typically refurbished by welding new metal in the flow path, and then machining the flow path components back to their original tolerances. Not only is refurbishment by welding and machining time-consuming and expensive, but the mechanical and thermal properties of the weld are inferior to those of the steel used to make the gate valve. Furthermore, for sour service, where welds are exposed to $H_2S$, the welds are susceptible to sulphide stress corrosion cracking (SSCC).

A further common problem with gate valves is that abrasive fracturing fluids tend to be drawn into the gate mechanism when the gate is opened and closed. Attempts have been made to redress this particular problem by introducing seals or replaceable liners to inhibit fluid from entering the gate mechanism, such as, for example, in U.S. Pat. No. 4,051,863 to Still, U.S. Pat. No. 3,194,259 to Garrod, and U.S. Pat. No. 3,624,882 to Gustafson. Although these prior-art gate valves have seals or liners to inhibit fluid from penetrating into the gate mechanism, exposed flow-path components have a propensity to wear.

Consequently, there exists a need for a gate valve with improved erosion resistance that is more quickly and easily refurbished to original specifications.

SUMMARY OF THE INVENTION

It is therefore an object of the invention to provide a gate valve with improved wear resistance.

It is another object of the invention to provide a gate valve that is quickly and easily refurbished to original specifications.

In accordance with a first aspect of the invention there is provided a valve body having a generally cylindrical passage defining a flow path through the valve; a gate for controlling fluid flow through the valve, the gate being translatable in a plane perpendicular to the flow path between an open position, in which fluid flows through the valve, and a closed position, in which fluid flow is obstructed; and a replaceable flow-path liner received within the valve body for protectively lining an entire length of the flow path.

In accordance with a second aspect of the invention, a method of refurbishing a gate valve includes the steps of disassembling the gate valve; removing flow-path inserts from the gate valve; inspecting the flow-path inserts; replacing any worn flow-path inserts; and reassembling the gate valve.

BRIEF DESCRIPTION OF THE DRAWINGS

Further features and advantages of the present invention will become apparent from the following detailed description, taken in combination with the appended drawings, in which:

FIG. 4 is a perspective view of the gate valve shown in FIG. 1, illustrating the valve body removed to show the gate in the open position;

FIG. 5 is a perspective view of the gate valve shown in FIG. 1, illustrating the valve body removed to show the gate in the closed position;

It will be noted that throughout the appended drawings, like features are identified by like reference numerals.

DETAILED DESCRIPTION OF THE PREFERRED EMBODIMENT

The invention provides a gate valve that includes a valve body having a cylindrical passage defining a flow path through the valve, a gate for controlling fluid flow through the valve with a replaceable wear-resistant flow-path liner for protectively lining the flow path through the valve. The flow-path liner includes a plurality of replaceable wear-resistant inserts, e.g. replaceable wear sleeves for protectively lining ports of the valve body, replaceable valve seats for lining the valve body and a replaceable gate insert for a flow path bore through the gate. By regularly inspecting and replacing worn inserts, a service life of the gate valve can be significantly prolonged, thus obviating a considerable expense associated with replacing or rebuilding the valve body.

Figure 1:
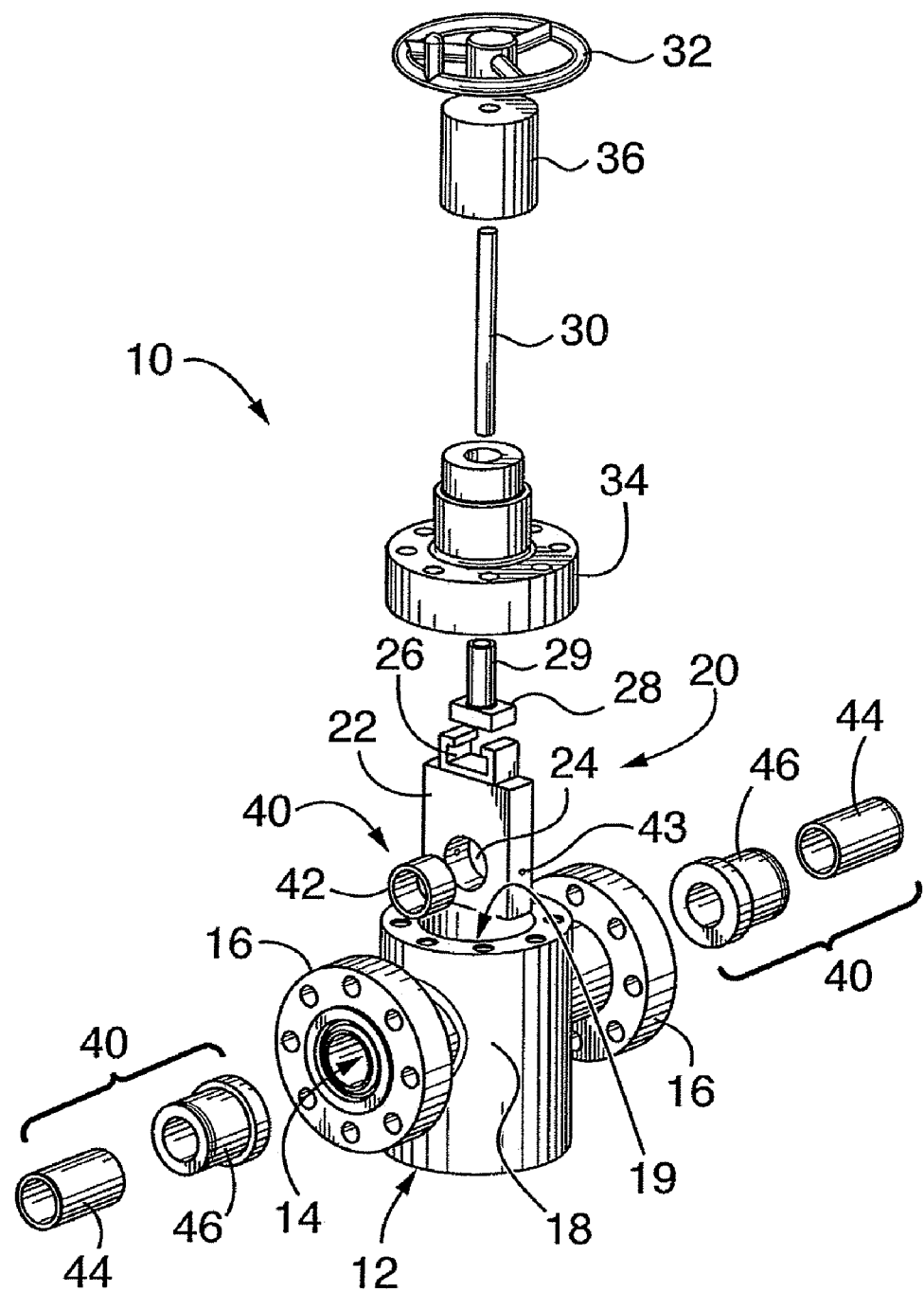
FIG. 1 is an exploded view of a gate valve in accordance with an embodiment of the invention.
Figure 2:
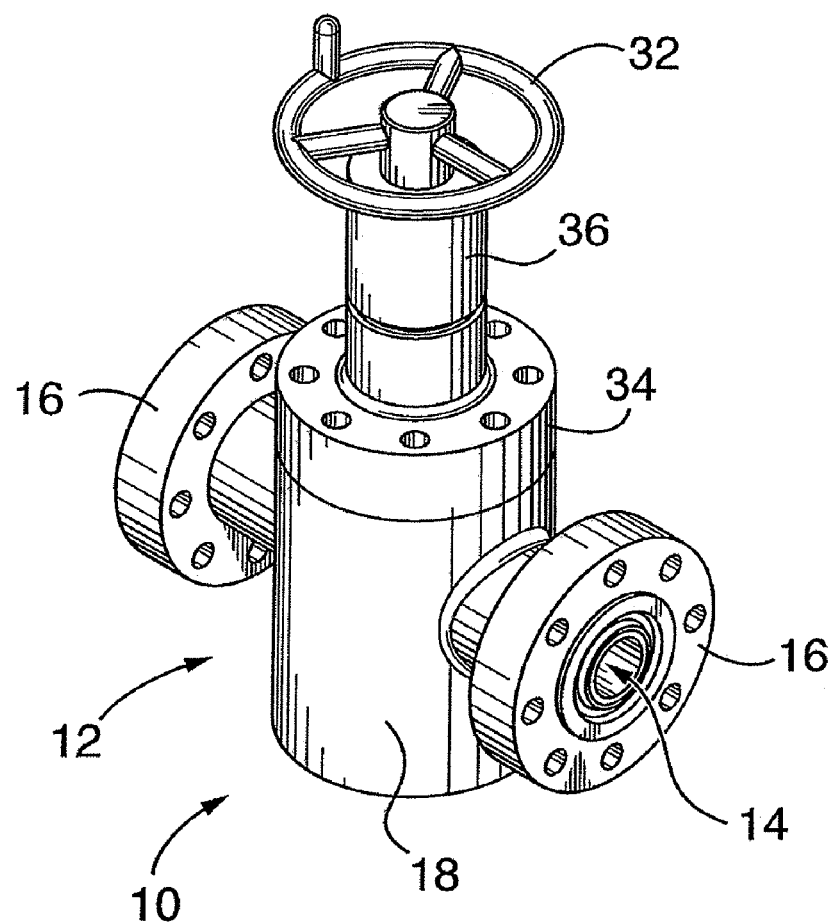
FIG. 2 is a perspective view of the fully assembled gate valve in accordance with the embodiment shown in FIG. 1.

FIGS. 1 and 2 are exploded and assembled views, respectively, of a gate valve, generally indicated by the reference numeral 10, in accordance with an embodiment of the invention. The gate valve 10 includes a valve body 12, which is the most expensive component of the gate valve. The valve body 12 has a generally cylindrical passage defining a flow path 14 through the valve. The flow path 14 extends between a pair of opposed flanged ports 16. The valve body 12 also has a gate housing 18 which is a tubular structure transverse to the flow path 14. The gate housing 18 includes a large cavity 19 in which a gate mechanism 20 is housed. The gate mechanism 20 is encased by a flange 34, which is connected by threaded fasteners to the gate housing 18, and also by a cap 36, which is mounted to the flange.

Figure 3:
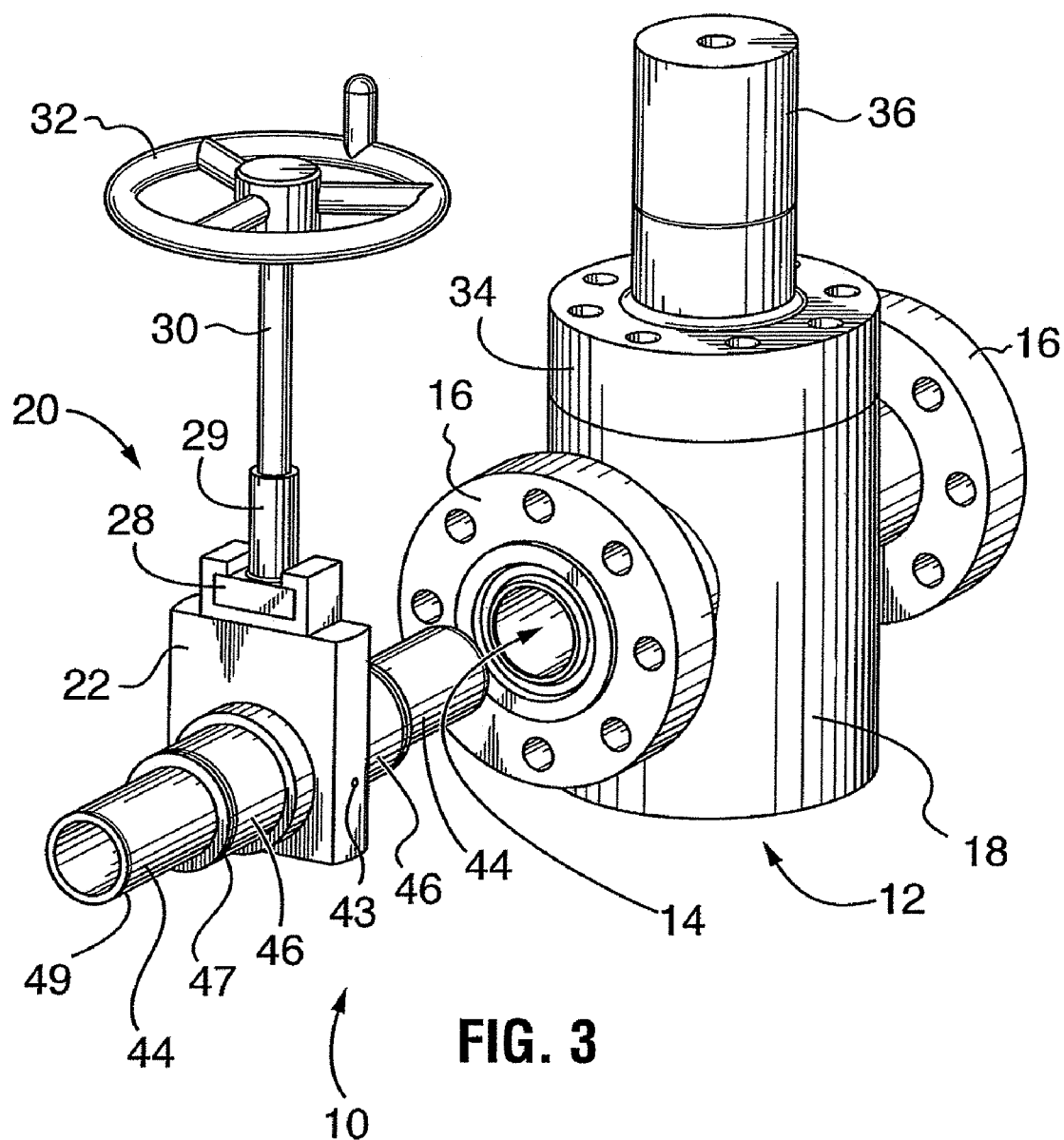
FIG. 3 is a perspective view of the gate valve shown in FIG. 1, illustrating the gate mechanism and replaceable inserts removed from the valve body, flange and cap.

As shown in FIGS. 1 and 3, the gate mechanism 20 includes a gate 22 having a flow path bore 24 that forms part of the flow path when the gate is in an open position. The gate can be moved in a plane perpendicular to the flow path between an open position, in which fluid flows through the valve, and a closed position, in which fluid flow is obstructed using a valve control wheel 32. The gate 22 also includes a rectangular slot 26 into which a gate control block 28 is received. Mounted to the gate control block 28 is a sleeve 29 for receiving a stem 30. The stem is connected to valve control wheel 32, or other such mechanism for applying torque to the stem. Torque applied to the valve control wheel causes the stem to rotate. Rotation of the stem is converted into movement of the gate, i.e., moving the gate from an opened to a closed position, or vice versa, in a manner well known in the art.

As shown in FIG. 1, the gate valve 10 includes a replaceable flow-path liner 40 protectively lining the flow path 14. In the illustrated embodiment, the replaceable flow-path liner 40 extends throughout an entire length of the flow path 14, although persons of ordinary skill in the art will appreciate that the replaceable flow-path liner 40 could be extended over only a portion of the flow path 14 to protect a selected portion of the flow path most susceptible to wear.

As shown in FIG. 1, the replaceable flow-path liner 40 includes five replaceable, contiguous wear-resistant inserts. The replaceable inserts include a replaceable gate insert 42 for protectively lining the flow path bore 24 in the gate 22; a pair of replaceable wear sleeves 44 for protectively lining the ports 16 of the valve body 12; and a pair of replaceable valve seats 46 for protectively lining the flow path between the gate insert 42 and the wear sleeves 44.

As shown in FIGS. 1 and 3, the gate 22 further includes a pair of bores 43 that are orthogonal to the flow path 14. The bores 43 receive mechanical fasteners, such as set screws (not illustrated). The mechanical fasteners secure the replaceable gate insert 42 within the flow path bore 24 through the gate 22.

As shown in FIG. 3, the replaceable valve seats 46 an inner end of the replaceable wear sleeves 44 at an outer end and are in abutment with the surfaces of the gate 22 at an inner end. In another embodiment of the wear inserts, the wear sleeves 44 pass substantially through the valve seats 46. O-rings 47 provide a fluid seal between the inner end of the valve seats 46 and the valve body 12. Likewise, o-rings 49 provide a fluid seal between the replaceable wear sleeves 44 and valve body ports 16.

FIG. 4 shows the replaceable valve seats 46 aligned with the flow path 14 in the open position in which fluid is free to flow through the bore 24 in the gate 22. For the sake of illustration, the valve body 12 is shown removed in both FIG. 4 and FIG. 5. The gate 22 is shown in the closed position in FIG. 5, as the valve seats 46 are offset with respect to the flow path 14. The flow path 14 is obstructed by the solid upper portion of the gate 22.

Figure 6:
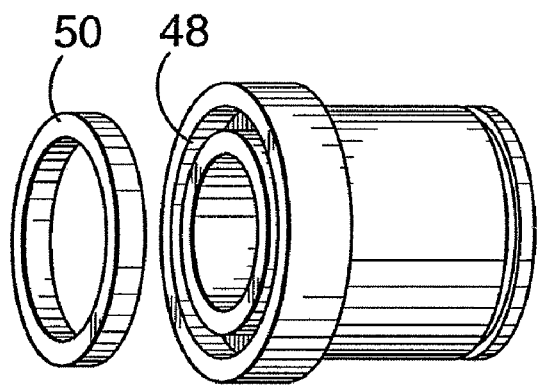
FIG. 6 is a perspective view of a replaceable valve seat with a wiper ring in accordance with another embodiment of the invention
Figure 7:
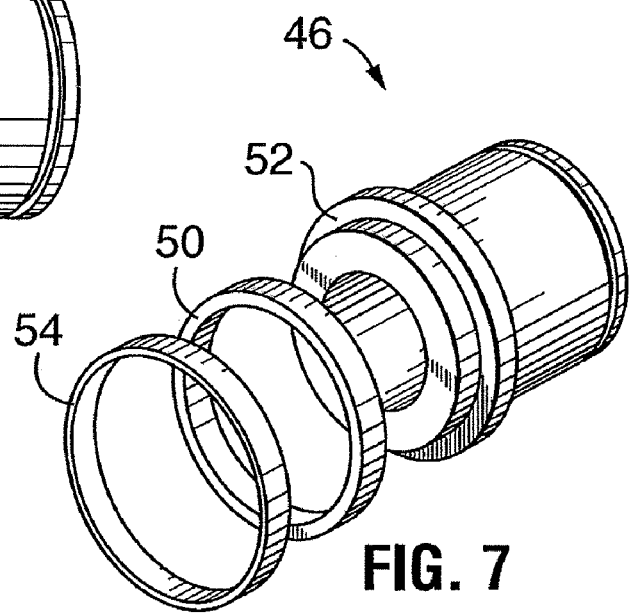
FIG. 7 is a perspective view of a replaceable valve seat with a wiper ring and a retainer ring in accordance with a further embodiment of the invention.

As shown in FIGS. 6 and 7, each replaceable valve seat 46 includes a wiper ring 50. When the gate 22 is opened or closed, the wiper ring 50 wipes the gate, thereby cleaning the gate of fluids, proppants or other debris that would otherwise be drawn into, and potentially clog, the gate mechanism 20.

As shown in FIG. 6, the replaceable valve seats 46 may include an annular groove 48 for receiving the wiper ring 50. The wiper ring 50 can be made of rubber, polyurethane or any other material that is suitable for cleaning the surfaces of the gate.

A further embodiment of the valve seat 46 is shown in FIG. 7 in which the valve seat includes an annular shoulder 52 for receiving the wiper ring 50. The wiper ring 50 is surrounded and retained in place by a retainer ring 54. The retainer ring 54 can be made of brass, bronze, stainless steel or other suitable material.

In one embodiment, the gate insert 42 may be made of 4340 steel. For sour well service, the gate insert can be made of 17-4 stainless steel. The replaceable wear sleeves 44 may be made of 4340 steel or 8620 case hardened steel. For sour well service, the replaceable wear sleeves can be 17-4 stainless steel. The valve seats 46 in one embodiment are 4140 steel, although they may likewise be made of 4340 steel or 8620 case hardened steel. The valve body, flange, cap are made of AISI 4130 or 4140 steel. The valve gate can be made of 17-4 stainless steel to permit the gate valve 10 to be used for sour service applications.

The service life of this gate valve 10 can be prolonged significantly by replacing the wear-resistant inserts at regular maintenance intervals. The gate valve can be disassembled and the various inserts inspected and replaced as required to return the gate valve 10 to its initial specifications. Due to the advantageous design of this gate valve, worn inserts can be quickly and easily replaced. The replaceable inserts therefore obviate the need to rebuild or replace the expensive valve body 12 or other valve components including the valve gate 22.

Figure 8:
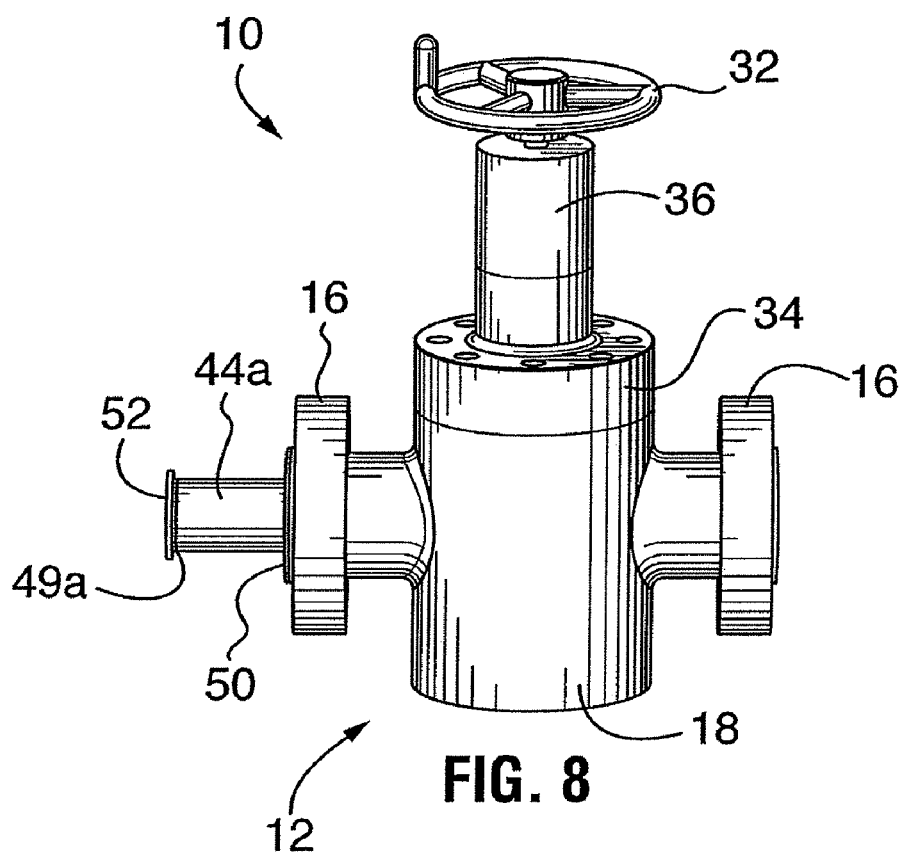
FIG. 8 is a perspective view of an assembled gate valve in accordance with the invention equipped with a replaceable insert used for interconnecting the gate valve with another gate valve or plug valve, a fracturing head, a wellhead isolation tool or any other component in a pressure control stack used for well stimulation operations.

FIG. 8 is a side perspective view from the side of a gate valve 10 in accordance with the invention equipped with a wear-resistant replaceable sleeve 44a in accordance with another aspect of the invention. The wear-resistant replaceable sleeve 44a is longer than the port 16 in which it is inserted. The inserted end of the wear sleeve 44a is configured in the same way as the wear sleeve 44 shown in FIGS. 1 and 3-5. The free end of wear sleeve 44a permits a seamless connection between the gate valve 10 and any other pressure control element equipped with wear-resistant flow path inserts in a pressure control stack. For example, a connection between the gate valve 10 and a plug valve with wear-resistant inserts as described in applicant's co-pending U.S. patent application Ser. No. 10/912,944, published on Feb. 9, 2006, with publication No. US-2006-0027779-A1 and entitled HIGH PRESSURE PLUG VALVE WITH REPLACEABLE INSERTS AND METHOD OF REFURBISHING SAME, filed Aug. 6, 2004, or a connection between the gate valve and a fracturing head with wear-resistant inserts described in Applicant's co-pending U.S. patent application Ser. No. 10/979,328, published on May 4, 2006 with publication No. US-2006-0090891-A1 and entitled FRACTURING HEAD WITH REPLACEABLE INSERTS FOR IMPROVED WEAR RESISTANCE AND METHOD OF REFURBISH- ING SAME filed on Nov. 2, 2004, the specifications of which are respectively incorporated herein by reference.

The seamless connection enabled by the replaceable wear-resistant sleeve 44a prevents erosion at the flanged connection of two elements in a pressure control stack. The length of the wear sleeve 44a depends on the element to which the gate valve 10 is to be connected. The free end of the replaceable wear-resistant sleeve cooperates with another wear-resistant insert in the other element in the flow control stack to provide the seamless connection between the gate valve 10 and the other element. A fluid seal is provided on the free end of the wear sleeve by an O-ring 49a. Alternatively or in addition, a fluid seal can be provided by ring gaskets 52 and flange gaskets 50. Providing a seamless connection between elements in the flow control stack prolongs the life of replaceable wear-resistant sleeves used to line the respective flow paths at the connection, and also ensures that there is no washout damage to ports of the interconnected elements. Washout at flanged connections tends to become a problem at high volume pump rates.

Persons of ordinary skill in the art will appreciate, in light of this specification, that minor variations may be made to the components of the gate valve without departing from the sprit and scope of the invention. The embodiments of the invention described above are therefore intended to be exemplary only and the scope of the invention is limited only by the scope of the appended claims.

Figure 9:
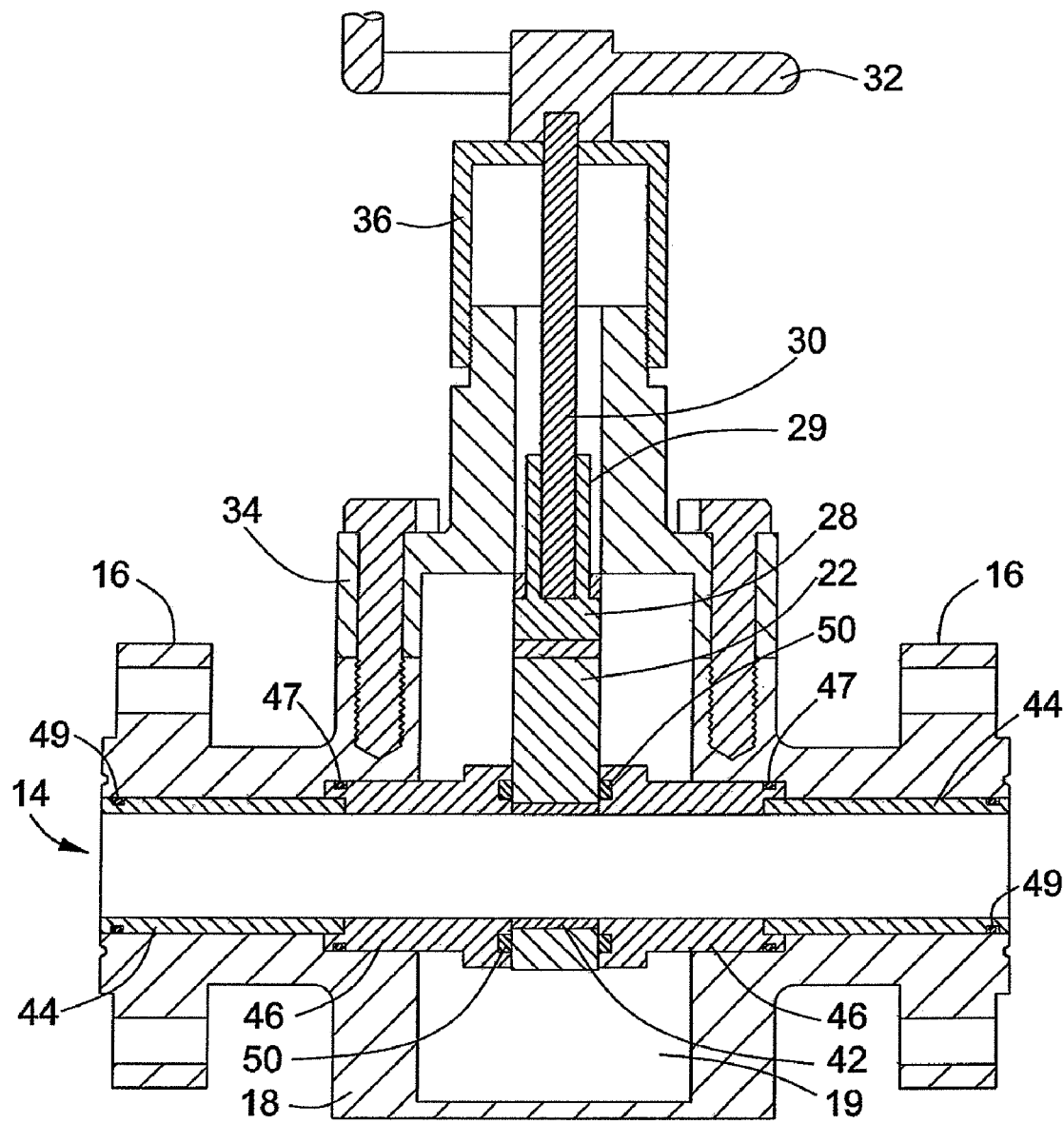
FIG. 9 is a cross-sectional view of the gate valve shown in FIGS. 1-6.

FIG. 9 is a cross-sectional view of one embodiment of the gate valve 10 shown in FIGS. 1-6. Because all of the components of the gate valve 10 have been described above in detail with reference to FIGS. 1-6, they are not redundantly described.

We claim:

1. A gate valve for use in severe service applications, comprising:
   a valve body having a generally cylindrical passage defining a flow path through the gate valve;
   a gate for controlling fluid flow through the gate valve, the gate being translatable in a plane perpendicular to the flow path between an open position, in which fluid flows through the gate valve and the gate, and a closed position, in which fluid flow is obstructed by the gate; and
   a replaceable flow-path liner that extends throughout an entire length of the flow path, comprising:
      a cylindrical steel valve seat received in the flow path on each side of the gate, each cylindrical steel valve seat having an inner end that abuts the gate;
      a steel wear sleeve received in respective valve body ports of the valve body, the steel wear sleeves having respective inner ends received in respective outer ends of the respective cylindrical steel valve seats; and,
      a cylindrical steel gate insert received in the flow path through the gate and retained in the flow path through the gate by a mechanical fastener.

2. The gate valve as claimed in claim 1 wherein the respective inner ends of the steel wear sleeves pass substantially through the respective cylindrical steel valve seats.

3. The gate valve as claimed in claim 1 further comprising an O-ring to provide a fluid seal between an outer end of the respective steel wear sleeves and the respective valve body ports.

4. The gate valve as claimed in claim 1 wherein the inner end of each of the cylindrical steel valve seats further comprises an annular groove that receives a wiper ring for cleaning the gate when the gate is opened or closed.

5. The gate valve as claimed in claim 1 wherein the inner end of each of the cylindrical steel valve seats comprises an annular shoulder for retaining a wiper ring for cleaning the gate when the gate is opened or closed; and, a retainer ring surrounding the wiper ring and retaining the wiper ring in place.

6. The gate valve as claimed in claim 1 further comprising an O-ring that provides a fluid seal between an outer end of each of the cylindrical steel valve seats and the flow path on each side of the gate.

7. The gate valve as claimed in claim 1 wherein the cylindrical steel gate insert comprises one of: 4340 steel and 17-4 stainless steel.

8. The gate valve as claimed in claim 1 wherein the steel wear sleeves comprise one of: 4340 steel, 8620 case hardened steel and 17-4 stainless steel.

9. The gate valve as claimed in claim 1 wherein the cylindrical steel valve seats comprise one of: 4140 steel, 4340 steel and 8620 case hardened steel.

10. A gate valve for use in severe service applications, comprising:
    a valve body having a generally cylindrical passage defining a flow path through the gate valve;
    a gate for controlling fluid flow through the gate valve, the gate being translatable in a plane perpendicular to the flow path between an open position, in which fluid flows through the gate valve and the gate, and a closed position, in which fluid flow is obstructed by the gate; and
    a replaceable flow-path liner that extends throughout an entire length of the flow path, the flow path liner including:
       a cylindrical steel valve seat received in the flow path on each side of the gate, each cylindrical steel valve seat having an inner end that abuts the gate, the inner end supporting a wiper ring for cleaning the gate;
       a steel wear sleeve received in respective valve body ports of the valve body, the steel wear sleeves having respective inner ends received in respective outer ends of the respective cylindrical steel valve seats; and,
       a cylindrical steel gate insert received in the flow path through the gate and retained in the flow path through the gate by at least one mechanical fastener.

11. The gate valve as claimed in claim 10 wherein the inner ends of the respective steel wear sleeves pass substantially through the respective cylindrical steel valve seats.

12. The gate valve as claimed in claim 10 further comprising an O-ring that provides a fluid seal between an outer end of the respective steel wear sleeves and the respective valve body ports.

13. The gate valve as claimed in claim 10 wherein the wiper ring is received in an annular groove in the inner end of the respective cylindrical steel valve seats.

14. The gate valve as claimed in claim 10 wherein the inner end of each of the cylindrical steel valve seats comprises an annular shoulder for retaining the wiper ring, and a retainer ring surrounds the wiper ring and retains the wiper ring on the annular shoulder.

15. The gate valve as claimed in claim 10 further comprising an O-ring that provides a fluid seal between an outer end of the respective cylindrical steel valve seats and the flow path on respective sides of the gate.

16. A gate valve for use in severe service applications, with a valve body having a generally cylindrical passage defining a flow path through the gate valve and a gate for controlling fluid flow through the flow path, the gate being translatable in a plane perpendicular to the flow path between an open position, in which fluid flows through the gate valve and the gate and a closed position in which fluid flow is obstructed by the gate, comprising:

a cylindrical steel valve seat received in the flow path on each side of the gate, each cylindrical steel valve seat having an inner end that abuts the gate, the inner end supporting a wiper ring for cleaning the gate;

a steel wear sleeve received in respective valve body ports of the valve body, the steel wear sleeves having respective inner ends received in respective outer ends of the respective cylindrical steel valve seats and outer ends that respectively extend to respective outer sides of the flow path through the gate valve, and O-rings that provide a fluid seal between the respective outer ends of the respective steel wear sleeves and the respective valve body ports; and a cylindrical steel gate insert received in the flow path through the gate and removably retained in the flow path through the gate.

17. The gate valve as claimed in claim 16 wherein the inner ends of the respective steel wear sleeves pass substantially through the respective cylindrical steel valve seats.

18. The gate valve as claimed in claim 16 wherein the wiper ring is received in an annular groove in the inner end of the respective cylindrical steel valve seats.

19. The gate valve as claimed in claim 16 wherein the inner end of each the cylindrical steel valve seats comprises an annular shoulder for retaining the wiper ring, and a retainer ring surrounds the wiper ring and retains the wiper ring on the annular shoulder.

20. The gate valve as claimed in claim 16 further comprising an O-ring that provides a fluid seal between an outer end of the respective cylindrical steel valve seats and the flow path on respective sides of the gate.

* * * * *